US011077682B2

(12) United States Patent
Urlaub et al.

(10) Patent No.: US 11,077,682 B2
(45) Date of Patent: Aug. 3, 2021

(54) TRAY ORIENTATION AND PRINT SIZE SELECTION FOR PRINTING

(71) Applicant: HEWLETT-PACKARD DEVELOPMENT COMPANY, L.P., Houston, TX (US)

(72) Inventors: Joshua I. Urlaub, Vancouver, WA (US); Brent T. Krieger, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 19 days.

(21) Appl. No.: 16/500,532

(22) PCT Filed: Apr. 15, 2017

(86) PCT No.: PCT/US2017/027825
§ 371 (c)(1),
(2) Date: Oct. 3, 2019

(87) PCT Pub. No.: WO2018/190882
PCT Pub. Date: Oct. 18, 2018

(65) Prior Publication Data
US 2020/0189298 A1   Jun. 18, 2020

(51) Int. Cl.
*H04N 1/23* (2006.01)
*B41J 13/00* (2006.01)
*B41J 11/58* (2006.01)
*H04N 1/00* (2006.01)

(52) U.S. Cl.
CPC ......... *B41J 13/0009* (2013.01); *B41J 11/58* (2013.01); *H04N 1/00694* (2013.01); *H04N 1/00708* (2013.01); *H04N 1/2323* (2013.01); *H04N 2201/325* (2013.01); *H04N 2201/3254* (2013.01)

(58) Field of Classification Search
None
See application file for complete search history.

(56) References Cited

U.S. PATENT DOCUMENTS

| 5,574,551 | A  | 11/1996 | Kazakoff |
| 5,923,942 | A  | 7/1999 | Nuggehalli et al. |
| 7,093,992 | B2 | 8/2006 | Zeller et al. |
| 8,517,376 | B2 | 8/2013 | Walsh |
| 8,908,236 | B1 | 12/2014 | Rudge et al. |

(Continued)

OTHER PUBLICATIONS

Lexmark User's Guide, Mar. 2012, <http://content.etilize.com/user-manual/1022100761.pdf> 217 pages.

*Primary Examiner* — Dung D Tran
(74) *Attorney, Agent, or Firm* — HP Inc. Patent Department

(57) ABSTRACT

Printer tray orientation and print size selection includes receiving printable media in a tray of a printer. Tray guide positions of the tray are measured. An overall list overall list of all sizes of printable media capable of fitting in the tray is created by comparing dimension ranges of the tray guide positions to a predetermined media size dimension list for the tray in multiple orientations. A prioritized list of printable media sizes capable of fitting in the tray for given tray guide positions is created. A preferred printable media size is selected based on the prioritized list.

16 Claims, 11 Drawing Sheets

(56) References Cited

U.S. PATENT DOCUMENTS

| | | |
|---|---|---|
| 8,991,816 B1 | 3/2015 | Sundararaj et al. |
| 9,904,880 B2* | 2/2018 | Ikeda .................. G03G 15/5083 |
| 2006/0072139 A1* | 4/2006 | Hult ...................... B41J 11/003 |
| | | 358/1.13 |
| 2008/0290583 A1 | 11/2008 | Kubo et al. |
| 2010/0119272 A1* | 5/2010 | Lee .................... G03G 15/5016 |
| | | 399/389 |
| 2013/0222819 A1* | 8/2013 | Johnson ............. G06K 15/4065 |
| | | 358/1.6 |

* cited by examiner

FIG. 2

| Media Sizes |
| --- |
| |
| (Any Size) |
| Letter |
| (rotated) |
| Edge-to-Edge Letter |
| (Mixed Letter/Legal) |
| (Mixed Letter/Ledger) |
| Legal |
| Executive |
| (rotated) |
| Statement |
| (rotated) |
| Oficio 8.5×13 (DO NOT LOCALIZE in SW) |
| 11×17 |
| 12×18 |
| 3×5 |
| 4×6 |
| 5×7 |
| 5×8 |
| A3 |
| A4 |
| (rotated) |
| Edge-to-Edge A4 |
| (Mixed A4/A3) |
| A5 |
| (rotated) |
| A6 |
| (rotated) |
| RA3 |
| SRA3 |
| RA4 |
| SRA4 |
| B4 (JIS) |
| B5 (JIS) |

| Media Sizes (cont.) |
| --- |
| |
| (rotated) |
| B6 (JIS) |
| (rotated) |
| B6 (ISO) |
| L 9×13 cm |
| 10×15 cm |
| Oficio 216×340 mm (DO NOT LOCALIZE in SW) |
| 8K 270×390 mm |
| 16K 195×270 mm |
| (rotated) |
| 8K 260×368 mm |
| 16K 184×260 mm |
| (rotated) |
| 8K 273×394 mm |
| 16K 197×273 mm |
| (rotated) |
| Windows: Japanese PostcardMac/Linux: Postcard (JIS) |
| (rotated) |
| Windows: Double Japan Postcard RotatedMac/Linux: Double Postcard (JIS) |
| (rotated) |
| Envelope #9 |
| Envelope #10 |
| Envelope Monarch |
| Envelope B5 |
| Envelope C5 |
| Envelope C6 |
| Envelope DL |
| Japanese Envelope Chou #3 |
| Japanese Envelope Chou #4 |
| (Unknown Envelope) |
| (Buisiness Card) |
| (Maximum) |
| Custom Sizes |
| (Any Custom) |

FIG. 3

| Media Sizes | Regional Ordering | |
|---|---|---|
| | Region "US" | Region "EU" |
| (Any Size) | 0 | 0 |
| Letter | 1 | 24 |
| (rotated) | 1 | 24 |
| Edge-to-Edge Letter | 1 | 24 |
| (Mixed Letter/Legal) | 1 | 24 |
| (Mixed Letter/Ledger) | 1 | 24 |
| Legal | 2 | 25 |
| Executive | 3 | 26 |
| (rotated) | 3 | 26 |
| Statement | 4 | 27 |
| (rotated) | 4 | 27 |
| Oficio 8.5×13 (DO NOT LOCALIZE in SW) | 5 | 28 |
| 11×17 | 6 | 29 |
| 12×18 | 7 | 30 |
| 3×5 | 8 | 31 |
| 4×6 | 9 | 32 |
| 5×7 | 10 | 33 |
| 5×8 | 11 | 34 |
| A3 | 20 | 9 |
| A4 | 12 | 1 |
| (rotated) | 12 | 1 |
| Edge-to-Edge A4 | 12 | 1 |
| (Mixed A4/A3) | 12 | 1 |
| A5 | 14 | 3 |
| (rotated) | 14 | 3 |
| A6 | 15 | 4 |
| (rotated) | 15 | 4 |
| RA3 | 21 | 10 |
| SRA3 | 22 | 11 |
| RA4 | 23 | 12 |
| SRA4 | 24 | 13 |
| B4 (JIS) | 17 | 6 |
| B5 (JIS) | 18 | 7 |

| Media Sizes (cont.) | Regional Ordering (cont.) | |
|---|---|---|
| | Region "US" | Region "EU" |
| (rotated) | 18 | 7 |
| B6 (JIS) | 19 | 8 |
| (rotated) | 19 | 8 |
| B6 (ISO) | 16 | 5 |
| L 9×13 cm | 31 | 20 |
| 10×15 cm | 32 | 21 |
| Oficio 216×340 mm (DO NOT LOCALIZE in SW) | 13 | 2 |
| 8K 270×390 mm | 25 | 14 |
| 16K 195×270 mm | 26 | 15 |
| (rotated) | 26 | 15 |
| 8K 260×368 mm | 27 | 16 |
| 16K 184×260 mm | 28 | 17 |
| (rotated) | 28 | 17 |
| 8K 273×394 mm | 29 | 18 |
| 16K 197×273 mm | 30 | 19 |
| (rotated) | 30 | 19 |
| Windows: Japanese PostcardMac/Linux: Postcard (JIS) | 33 | 22 |
| (rotated) | 33 | 22 |
| Windows: Double Japan Postcard RotatedMac/Linux: Double Postcard (JIS) | 34 | 23 |
| (rotated) | 34 | 23 |
| Envelope #9 | 35 | 41 |
| Envelope #10 | 36 | 42 |
| Envelope Monarch | 37 | 43 |
| Envelope B5 | 38 | 35 |
| Envelope C5 | 39 | 36 |
| Envelope C6 | 40 | 37 |
| Envelope DL | 41 | 38 |
| Japanese Envelope Chou #3 | 42 | 39 |
| Japanese Envelope Chou #4 | 43 | 40 |
| (Unknown Envelope) | 44 | 44 |
| (Buisiness Card) | 45 | 45 |
| (Maximum) | 46 | 46 |
| Custom Sizes | 47 | 47 |
| (Any Custom) | 48 | 48 |

TRAY ORIENTATION AND PRINT SIZE SELECTION FOR PRINTING

BACKGROUND

Printers containing a multipurpose (MP) tray typically support various sizes and types of paper. Using the MP tray allows for flexibility in the type and size of the printable media to be used, but with this flexibility there are also challenges in selecting the proper tray settings to use for a particular print job. Users typically welcome the opportunity to simply hit the 'print' button and assume the resulting print out will be perfectly aligned and formatted without having to manually input print settings.

BRIEF DESCRIPTION OF THE DRAWINGS

FIG. 2 is a list of media sizes used in a printer, according to an example herein;

FIG. 3 is a list of prioritized media sizes used in a printer, according to an example herein;

DETAILED DESCRIPTION

The examples provided below describe supporting automatic size detection and any size paper requirements for a printer tray, such as a MP tray. Automatic size detection on a MP tray typically ranges from "no size detection" to "all sizes detected". According to the various example, a printer automatically detects any size of paper for use and properly determines the correct orientation of the print job corresponding to the tray guide configuration. The any size setting is the default setting and can be selectively turned off. When set to off, a user can select other paper sizes. However, in order to facilitate an easier user experience in selecting the proper paper size, the list of possible sizes is truncated based on the tray guide position based on the media size in both orientations (width and length), which allows the user to more quickly and easily select the proper size of paper. The paper size can be measured by the printer, and paper can be inserted into the tray in any orientation (width or length) and the printer determines which orientation the paper is and how to correctly print for that particular orientation.

Figure 1B:
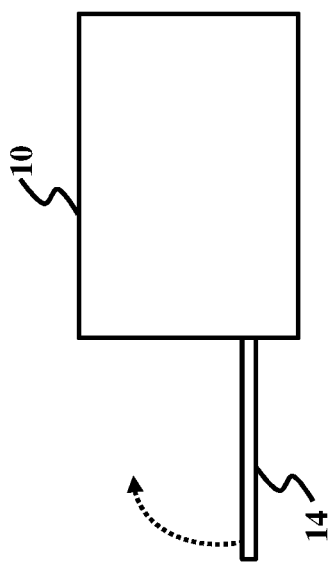
FIG. 1B is a side view of a printer, according to an example herein.
Figure 1C:
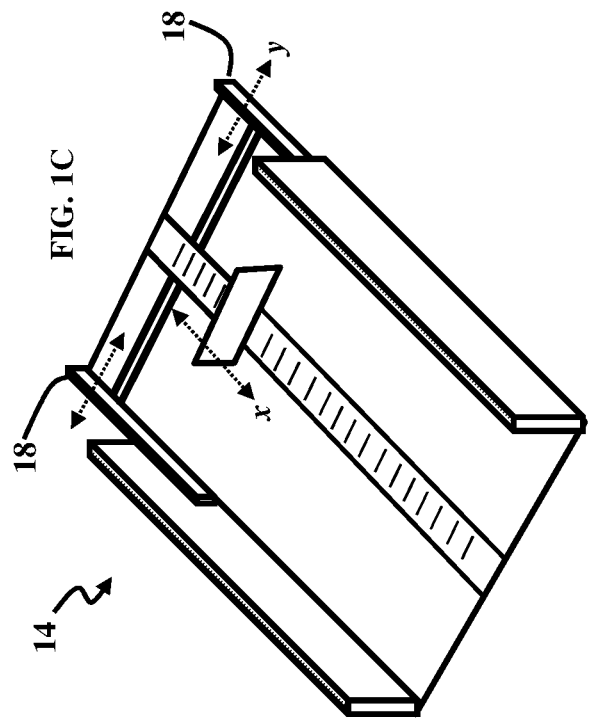
FIG. 1C is a perspective view of a tray used in a printer, according to an example herein.
Figure 1A:
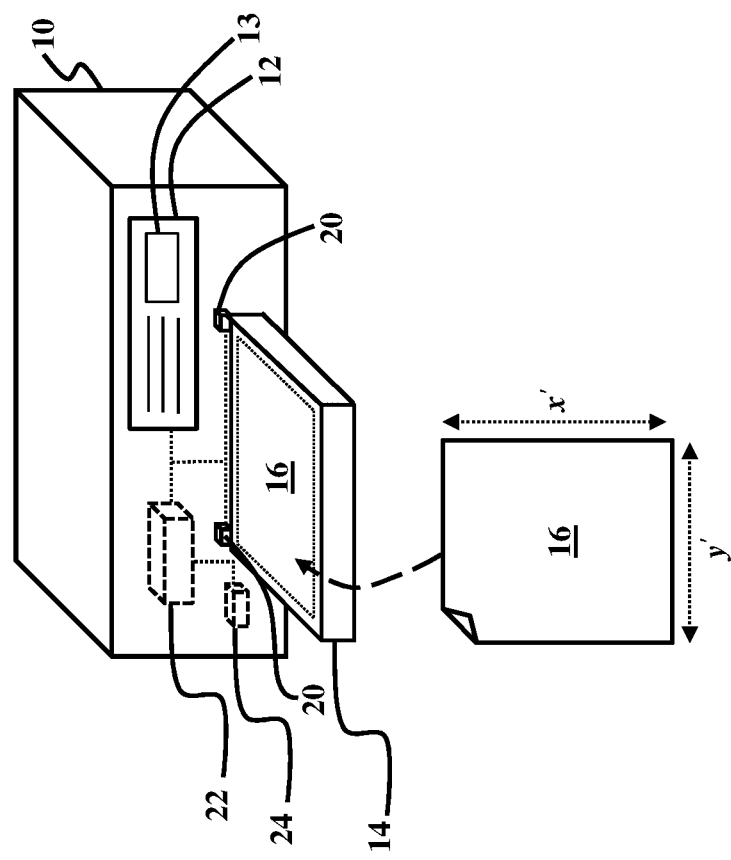
FIG. 1A is a perspective view of a printer, according to an example herein.

FIG. 1A illustrates a printer 10 comprising a user interface 12 operatively connected to the printer 10 and configured to permit user interaction through one or more graphical user interface (GUI) icons 13 displayed thereon, and a printer tray 14 operatively connected to the printer 10 and configured to receive printable media 16. The printer 10 may be configured as any type of printer including an inkjet or laser printer, for example. The printable media 16 may be configured as any of paper, envelopes, cards, transparencies, vellum, or any other type of media on which text and/or images may be printed, copied, or transferred. When described in the various examples herein, "paper" encompasses all types of printable media 16. The printer tray 14 may be configured as a MP tray that is configured to rotate/fold up and into the printer 10 and to support all media sizes, as depicted in FIG. 1B, or the tray 14 may be configured as a cassette tray, or any other type of tray suitable for use with the printer 10. As shown in FIG. 10, one or more moveable tray guides 18 are operatively connected to the multipurpose printer tray 14. A sensor 20 such as a potentiometer, shown in FIG. 1A, with reference to FIG. 10, may be operatively connected to the tray guide 18 and can be configured to measure minimum and maximum values for both dimensions x, y of the tray guide 18. A processor 22 is operatively connected to the sensor 20 and to a memory 24, which comprises instructions executable by the processor 22 to receive instructions for a print job comprising a requested media size, compare dimensions x', y' for the media size set for the print job and set for the multipurpose printer tray 14 to the measured minimum and maximum values for both dimensions x, y of the tray guide 18, and select a particular media size orientation for the print job based on whether the dimensions x, y' for the media size set for the print job is a closer fit to the measured minimum and maximum values orientation.

The instructions can cause the processor 22 to select an orientation for the media size based on the only orientation supported by the multipurpose printer tray 14. The instructions can cause the processor 22 to perform any of (i) compare the requested media size to detected dimensions x, y of the tray guide 18, (ii) compare a tray guide size setting to the detected dimensions x, y of the tray guide 18, and (iii) select a short-edge dimension orientation x for the media size, among other actions as described below.

FIG. 2, with reference to FIGS. 1A through 10, is a list 26 of media sizes capable of being used in the printer 10, according to an example herein. The list 26 may be updated as new media types and/or sizes are added to the capabilities of the printer 10 such that the updates may be generated through firmware stored in memory 24, processed by processor 22, and displayed on user interface 12. The listing of the various media types and/or sizes on list 26 may be configured in any appropriate manner including alphabetic, numeric, most common type/size used on the printer 10 based on previous print jobs, most common type/size used in the region where the printer 10 is being used, based on user configuration/ordering, or any other basis. The printer 10 may permit selection, by a user, of the preferred printable media size through user interface 12.

FIG. 3, with reference to FIGS. 1A through 2, in an "Any Size" behavior setting, is a list 28 of prioritized media sizes capable of being used in printer 10 and displayed on user interface 12, according to an example herein. The purpose of the "Any Size" setting is to accommodate the user's typical interaction with the tray 14; i.e., print jobs using media 16 not typically found in the other trays of the printer 10. In accordance with the examples herein, the "Any Size" setting reduces the need for the user to manually configure the tray 14. List 28 includes the corresponding ordering/ranking of the media sizes based on a United States (US) region or a European Union (EU) region. The ordering/ranking corresponds with the most popular media sizes used in those particular regions. The ranking of "0" corresponding to the "Any size" media size is the default top ranking media size in both the US and EU regions, according to an example herein. List 28 is based on the overall list 26 and internal media priority tables associated with the printer 10, and while the listing of the media sizes in list 26 and 28 are the same for presentation purposes of the figures, the examples herein may provide for list 28 to be presented as different listings/orderings. Additionally, list 28 may be a truncated version of list 26 such that only the top ten rankings, for example, may be presented in list 28. For presentation purposes of the figures, list 28 is not shown in a truncated manner with respect to list 26. Moreover, list 28 may be presented with only the Region "US" ordering/ranking presented for a printer 10 located in the United States, for example. Similarly, list 28 may be presented with only the Region "EU" ordering/ranking presented for a printer 10 located in the European Union, for example. Other regions outside the US or EU may have their own respective orderings/rankings according to those respective regions, and the lists 26, 28 may be configured to present the media sizes and their corresponding orderings/rankings based on those respective regions. For the purposes of ease of illustration, only the US and EU region orderings/rankings are presented in the figures. Similar to list 26, the list 28 may be updated as new media types and/or sizes are added to the capabilities of the printer 10 and as their rankings are updated also such that the updates may be generated through firmware stored in memory 24, processed by processor 22, and presented through user interface 12. The listing and rankings of the various media types and/or sizes on list 28 may be configured in any appropriate manner including most common type/size used on the printer 10 based on previous print jobs, most common type/size used in the region where the printer 10 is being used, or based on user configuration/ordering.

Figure 4:
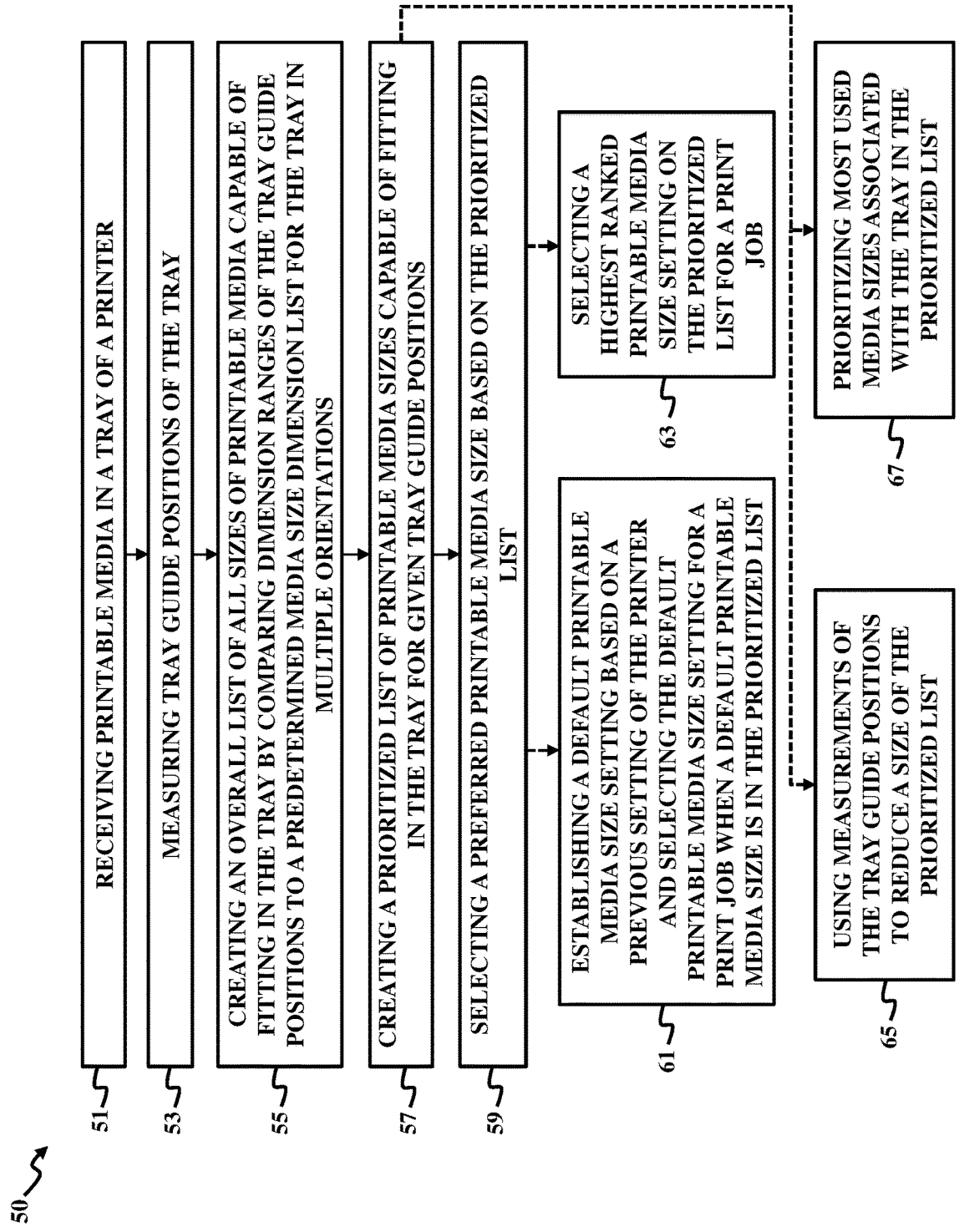
FIG. 4 is a flowchart illustrating a method, according to an example herein.

FIG. 4, with reference to FIGS. 1A through 3, is a flowchart illustrating a method 50, according to an example herein. The method 50 includes receiving printable media 16 in a tray 14 of a printer 10 as provided in block 51. Tray guide positions of the tray 14 are measured in block 53. An overall list 26 of all sizes of printable media 16 capable of fitting in the tray 14 is created in block 55 by comparing dimension ranges of the tray guide positions to a predetermined media size dimension list for the tray 14 in multiple orientations. Block 57 describes creating a prioritized list 28 of printable media sizes capable of fitting in the tray 14 for given tray guide positions. The prioritized list 28 may be a subset of the overall list 26. Block 59 provides selecting a preferred printable media size based on the prioritized list 28.

The method 50 may further comprise establishing a default printable media size setting based on a previous setting of the printer 10 and selecting the default printable media size setting for a print job when a default printable media size is in the prioritized list 28, as indicated in block 61. The method 50 may further comprise selecting a highest ranked printable media size setting on the prioritized list 28 for a print job in block 63. The method 50 may further comprise using measurements of the tray guide positions to reduce a size of the prioritized list 28 in block 65. The method 50 may further comprise prioritizing most used media sizes associated with the tray 14 in the prioritized list 28 as provided in block 67.

Figure 5:
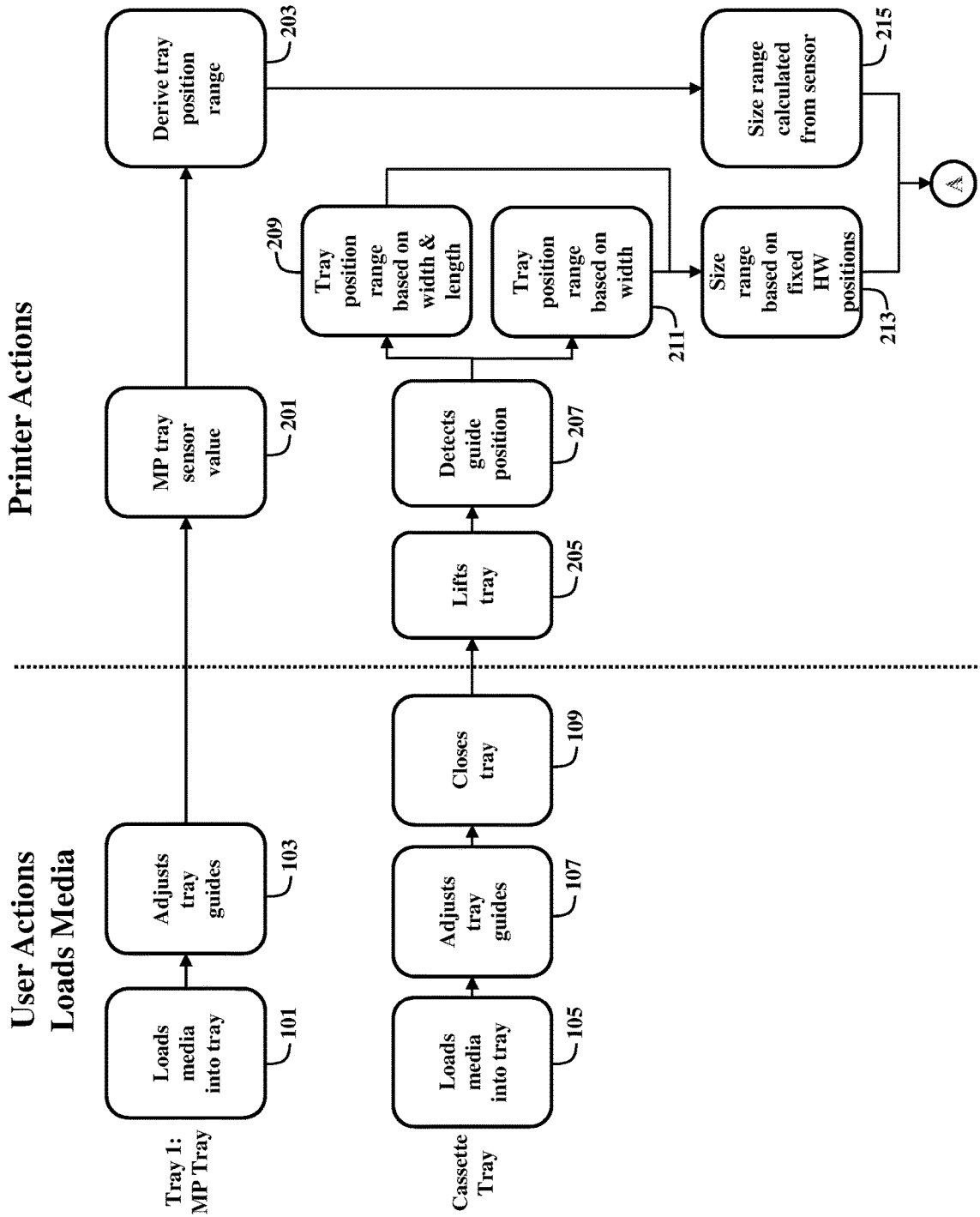
FIG. 5 is a flowchart illustrating a method of user actions and corresponding printer actions related to loading media in a printer, according to an example herein.
Figure 5:
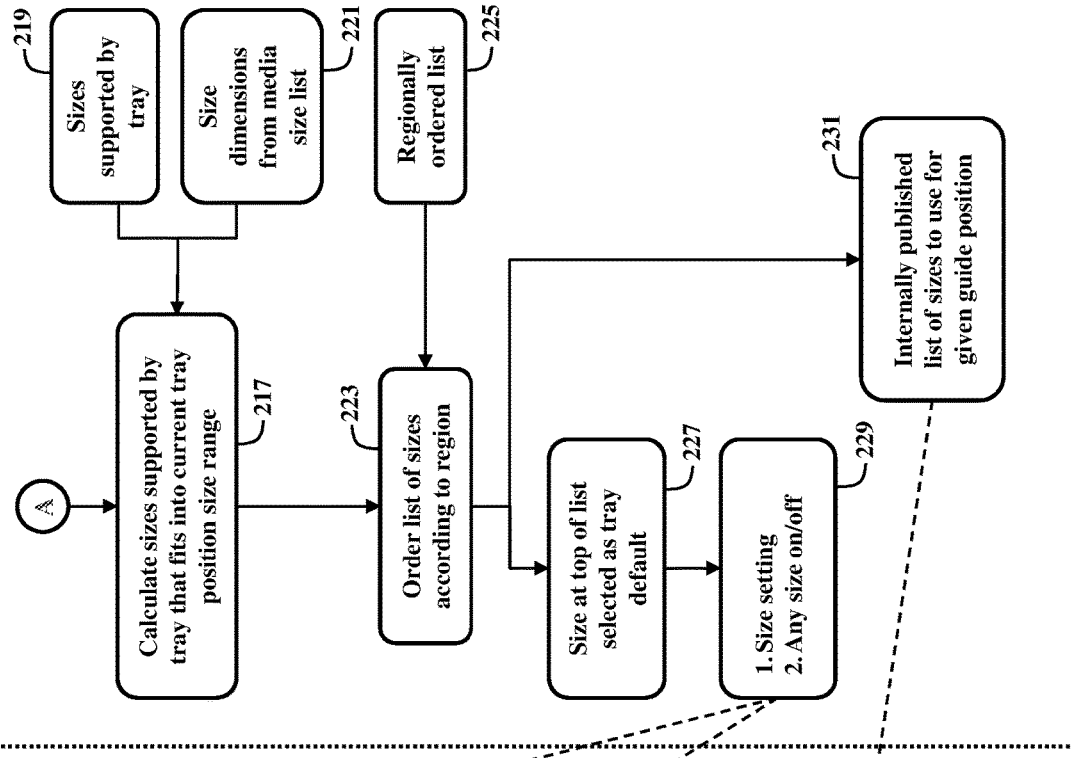
Figure 5:
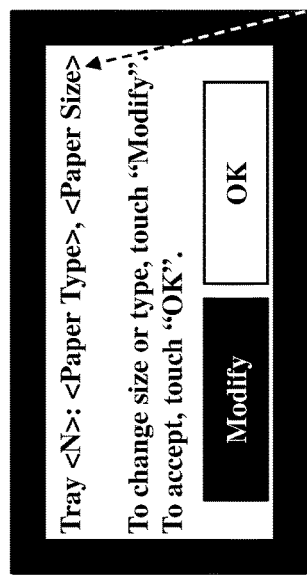
Figure 5:
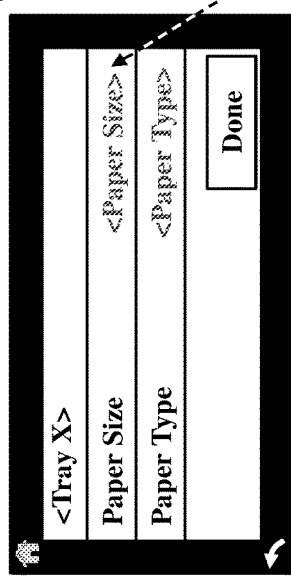
Figure 5:

FIG. 5, with reference to FIGS. 1A through 4, is a flowchart illustrating method of user actions and corresponding printer actions related to loading media 16 in a printer 10, according to an example herein. The vertical dotted line in FIG. 5 represents the distinction between user-related actions and printer-related actions. In one example, the actions occurring by the printer 10 may be programmed using firmware and saved in memory 24 and processed by processor 22. In block 101, the method includes loading media 16 into tray 14. The tray 14 may be configured as a MP tray in block 101. In block 103, the user can adjust the tray guides 18. Thereafter, the printer 10 reads the tray guide positions. This occurs with the processor 22 determining a MP tray sensor value based on measurements of the tray guide 18 taken by sensor 20. As an example, the sensor value may correspond to a digital binary code or an electrical signal transferred from the sensor 20 to the processor 22. Then, in block 203, the processor 22 may derive the tray position range, which includes a range of all possible sizes for which the tray guide 18 may be configured. The media size range is calculated by the processor 22 based on the data provided by the sensor 20 in block 215.

Again with reference to the user actions related to loading the media 16 in printer 10, in block 105, the tray 14 may be configured as a cassette tray. Thereafter, the user may adjust the tray guides 18 in block 107, and may then close the tray in block 109. Thereafter, on the printer 10, the tray 14 is lifted in block 205. The processor 22 detects the positions of the tray guides 18 in block 207. Next, two alternative actions can occur. In one example, the processor 22 may determine the tray position range based on the width and length of the tray guide 18 in block 209. In another example, the processor 22 may determine the tray position range based on the width of the tray guide 18 only in block 209. Whichever alternative is selected, the size range may based on fixed hardware positions of the printer 10 as indicated in block 213.

Blocks 213, 215 each lead to block 217, where the processor 22 calculate media sizes supported by the tray 14 that fits into the current tray position and size range. The calculation that occurs in block 217 may be based on a determination of any of the media sizes supported by the tray 14 as indicated in block 219, and the size dimensions from the media size list 26 as indicated in block 221. In particular, with respect to block 221, the processor 22 creates the list 28 comprising of all media sizes that will fit in the tray 14 by comparing dimension ranges obtained from the tray position range measurements provided in block 215 to the overall supported media size list 26 for the tray 14, in both orientations x, y. After block 217, the media sizes are ordered in list 28 according to the region associated with the printer 10 or selected by the user as indicated in block 223. The ordered list 28 may be stored in memory 24 and periodically updated, as described earlier, and as provided in block 225. Here, the processor 22 uses the list 26 and internal media priority tables stored in memory 24 to create the prioritized list 28 of media sizes that fit in the tray 14 for the given positions of the tray guide 18. The prioritization list 28 used may be dependent upon the "American" standard or metric based on the corresponding region that is selected; e.g., US region or EU region.

After block 223, any of the following actions described in blocks 227 and 231 may occur. In block 227, the media size at the top of the list 28 is considered the highest priority media size and is selected as the new media size for the tray 14, and is correspondingly established as the tray default setting, and then the printer 10 presents instructions relating to the size setting and/or an indication of the Any Size feature being on/off, in block 229. Alternatively, in block 231, the internally published list of sizes, saved in memory 24, are used for a given tray guide position. Here, if the media size that the tray 14 was set to previously is still in the list 28, then the processor 22 uses it as the default media size. With respect to block 229, the printer 10 displays the instructions on a home screen of the interface 12 to the user, as depicted in block 111, such that the media list 28 is displayed to allow the user to pick a new media size for the tray 14. In this regard, the instructions provided in block 111 refer to allowing the user to change the media size or type by selecting a "Modify" button, or to accept the indicated paper type and paper type for the tray 14 by selecting an "OK" button. If the "Modify" button is selected, then user is presented with block 113, which allows the user to select a desired paper size and paper type, and once selected, the user can press a "Done" button. Using the tray guide measurements provided in block 215 pares down the media list 26 into prioritized list 28 presented on user interface 12. For the user's convenience, the highest ranking or highest prioritized media size is presented at the top of the list 28, and which may represent the most widely used media size for a particular region where the printer 10 is located. If printer 10 performs the actions of block 231, then the user may be presented with the options depicted in block 115 where the paper size may be selected by the user.

Figure 6:
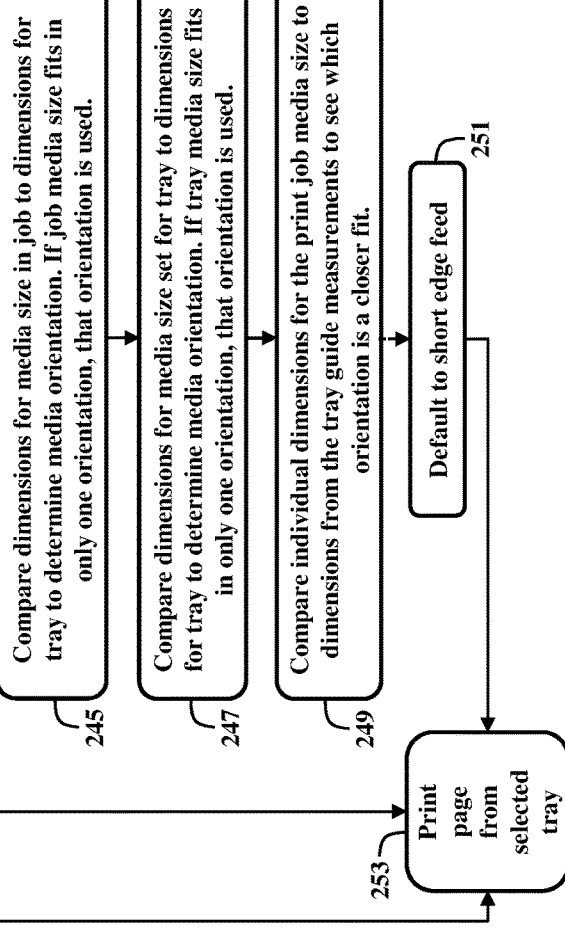
FIG. 6 is a flowchart illustrating a method of user actions and corresponding printer actions related to a print job, according to an example herein.

FIG. 6, with reference to FIGS. 1A through 5, is a flowchart illustrating a method of user actions and corresponding printer actions related to a print job, according to an example herein. The vertical dotted line in FIG. 6 represents the distinction between user-related actions and printer-related actions. In one example, the actions occurring by the printer 10 may be programmed using firmware and saved in memory 24 and processed by processor 22. In block 117, a user sends a print job to the printer 10 and may indicate/request a particular media size, media type, and media source to be used by the printer 10. In an example, the user may be remotely located from the printer 10 such that the user may be sending the print job to the printer 10 from a computer, tablet, smartphone or other electronic device 116 that is communicatively linked to the printer 10. Alternatively, in another example, the user may engage the printer 10 directly in order to create a copy job or may use a universal serial bus (USB) device to perform a print job. Once the instructions for the print job have been sent by the user in block 117, the processor 22 selects the appropriate tray 14 for use for each page in the print job by using the media size, media type, media source, and printer/tray settings, as indicated in block 223. In this regard, a given print job may include multiple pages each of which may be separately configured in terms of the required formatting, positioning of text and/or images, and size/orientation of the media 16.

Next, in block 235, the processor 22 determines whether the tray 14 has been set to an "Any Size" setting. If the tray 14 has been set to an "Any Size" setting, Yes, then the media 16 in the tray 14 is considered a proper size match for the corresponding print job irrespective of the print job setting for the media size, as indicated in block 239. In this regard, the processor 22 does not declare a print mismatch regardless of the actual media 16 in the tray 14. Then, the printer 10 prints a page(s) from the selected tray 14 in block 253 based on the parameters of the print job and the calculated orientation. Again with respect to block 235, if the tray 14 has not been set to an "Any Size" setting, No, then an orientation constraint is established by the processor 22 in block 237. Thereafter, the processor 22 receives measurements of the tray guide 18 to obtain minimum and maximum dimensions for both dimensions x, y of the tray guide 18, as indicated in block 241. In one example, the measurements are made by sensor 20. When the tray 14 is configured as a cassette tray and media 16 is loaded in accordance with block 105, the cassette tray guide positions may be based on distinct, fixed positions that do not change. In other examples, a cassette tray guide may also use a sensor 20, such as a potentiometer, in the width or length dimension detection configuration rather than a fixed position. The variable nature of a sensor 20 that is configured as a potentiometer may require adding or subtracting a buffer value from the base measurements provided by the sensor 20 in order to properly provide the minimum and maximum dimensions of the tray guide 18. Once the measurements of the tray guide 18 are determined, the processor 22 is able to exclude certain media orientations that are not permitted or accommodated by the tray guide 18, as shown in block 243. For example, if tray 14 only supports one orientation, then that orientation is used for the print job. Similarly, if the media size will only fit in tray 14 in one orientation, then that orientation is used.

In block 245, the processor 22 compares the dimensions for the media size in the print job to the dimensions for the tray 14, based on the measurements obtained for the tray guide 18 in block 241, to determine the proper media orientation for the print job. In this regard, the processor 22 determines whether all the dimensions x', y' for the media 16 are within the limits of the tray guide 18. In one example, the tray minimum width must be less than the media width, which must be less than the tray maximum width. Also, the tray minimum length must be less than the media length, which must be less than the tray maximum length. Alternatively, in another example, the tray minimum width must be less than the media length, which must be less than the tray maximum width. Also, the tray minimum length must be less than the media width, which must be less than the tray maximum length. If the media size of the user's requested print job fits in only one orientation, then that orientation is used by the printer 10, by default. If the orientation cannot be determined in block 245, then the process proceeds to block 247. Here, the processor 22 compares the dimensions for the media size set for the tray 14, based on the measurements obtained for the tray guide 18 in block 241, to the dimensions for the tray 14 to determine the proper media orientation for the print job. If the media size of the tray 14 fits in only one orientation, then that orientation is used by the printer 10, by default. If the orientation cannot be determined in block 247, then the process proceeds to block 249. Here, the processor 22 compares the individual dimensions for the print job media size to the dimensions from the tray guide measurements taken in block 241 to see which orientation is a closer fit. The processor 22 looks at the difference of the width and length of the corresponding dimensions x, y and x', y'. For example, the measured width minus the specified width of the respective dimensions x, y and x', y' are compared with the measured width minus the specified length of the respective dimensions x, y and x', y'. Also, the measured length minus the specified length of the respective dimensions x, y and x', y' are compared with the measured length minus the specified width of the respective dimensions x, y and x', y'. In one example, the measured values may actually be the dimension limits of the tray 14, if the tray dimensions x, y, cannot be measured. The processor 22 considers the measurable dimensions x, y and x', y' to see which comparison is closer. For example, if the measured width minus the specified width of the respective dimensions x, y and x', y' is less than the measured width minus the specified length of the respective x, y and x', y', then the short edge feed in the portrait orientation of the media 16 is selected. Alternatively, if the measured width minus the specified width of the respective dimensions x, y and x', y' is greater than the measured width minus the specified length of the respective x, y and x', y', then the long edge feed in the landscape orientation of the media 16 is selected. The default setting for the printer is the short edge feed of the media 16, as indicated in block 251. Then, the printer 10 prints a page(s) from the selected tray 14 in block 253.

Figure 7:
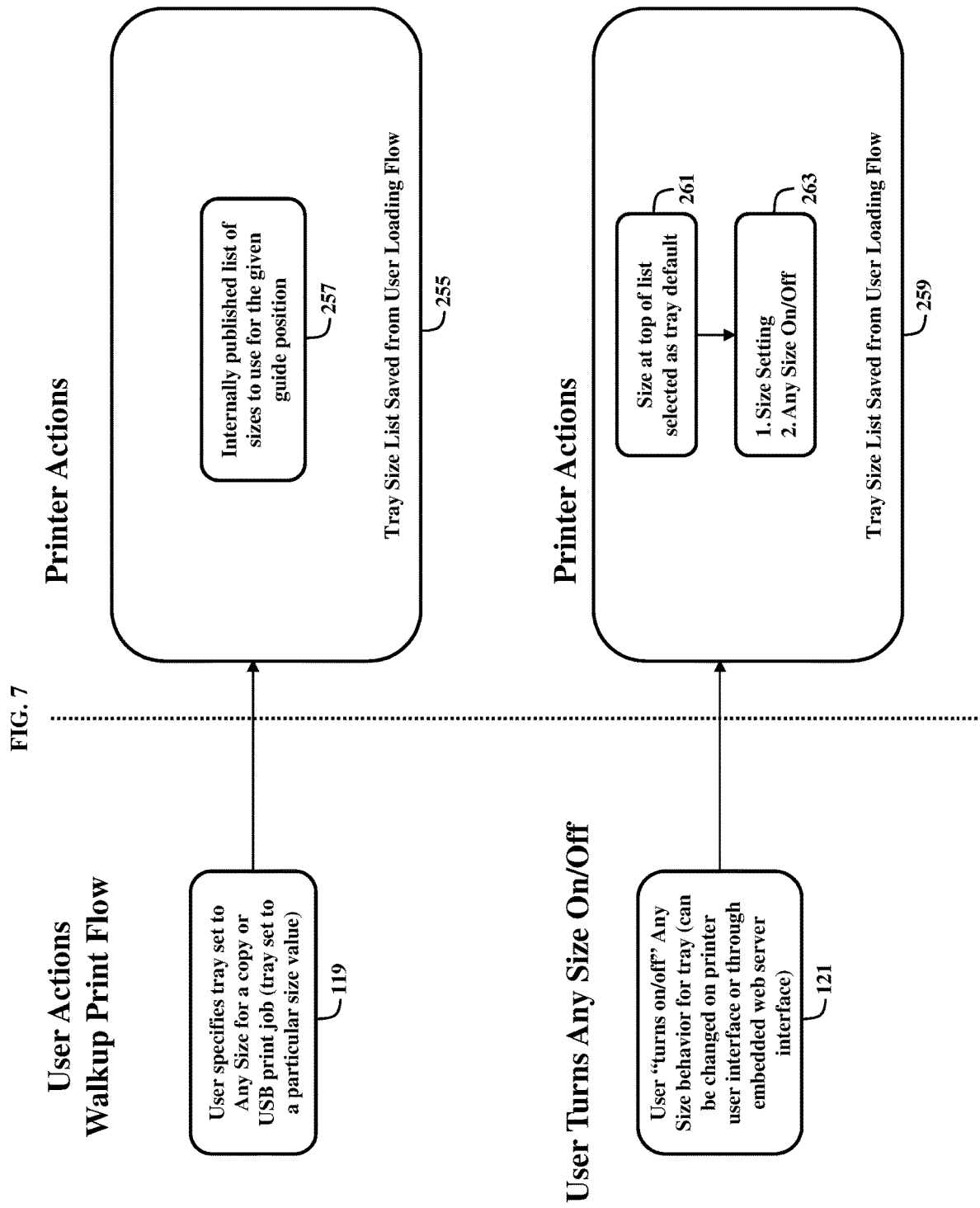
FIG. 7 is a flowchart illustrating a method of user actions and corresponding printer actions related to selecting media and tray settings, according to an example herein.

FIG. 7, with reference to FIGS. 1A through 6, is a flowchart illustrating a method of user actions and corresponding printer actions related to selecting media and tray settings, according to an example herein. The vertical dotted line in FIG. 7 represents the distinction between user-related walkup print flow actions and printer-related actions. In one example, the actions occurring by the printer 10 may be programmed using firmware and saved in memory 24 and processed by processor 22. In walkup flows such as 'copy', a user can typically select any tray as the source tray 14 for the media 16. However, a dimension is needed, which typically comes from the tray setting. By running the "Automatic Size Detection" setting and saving the dimension values in the tray setting, the walkup job can default to a size that is more correct than a printer without a size detection setting. In block 119, a user may specify the tray 14 to be set to an "Any Size" setting for a corresponding copy or USB print job such that the tray 14 is set to a particular size value. Correspondingly, the processor 22 retrieves the tray size list 26 saved from the user loading the print flow request in block 255. The processor 22 may select the list 26 of sizes from the memory 24, and uses the list 26 to determine which media size is appropriate for the given position of the tray guide 18, as depicted in block 257. In block 121, a user may turn on/off the "Any Size" behavior for the tray 14. This setting can be changed through user interface 12 or through an embedded web server interface, according to examples herein. Correspondingly, the processor 22 retrieves the tray size list 26 saved from the user loading the print flow request in block 259. Here, the processor 22 may select the media size(s) at the top of the list 28 as the default setting for the tray 14, as indicated in block 261. The processor 22 then presents the appropriate size setting and permits turning on/off the "Any Size" setting, as provided in block 263.

Various examples herein can include both hardware and software elements. The examples that are implemented in software include but are not limited to, firmware, resident software, microcode, etc. Other examples may comprise a computer program product configured to include a pre-configured set of instructions, which when performed, can result in actions as stated in conjunction with the methods described above. In an example, the pre-configured set of instructions can be stored on a tangible non-transitory computer readable medium or a program storage device containing software code.

Figure 8:
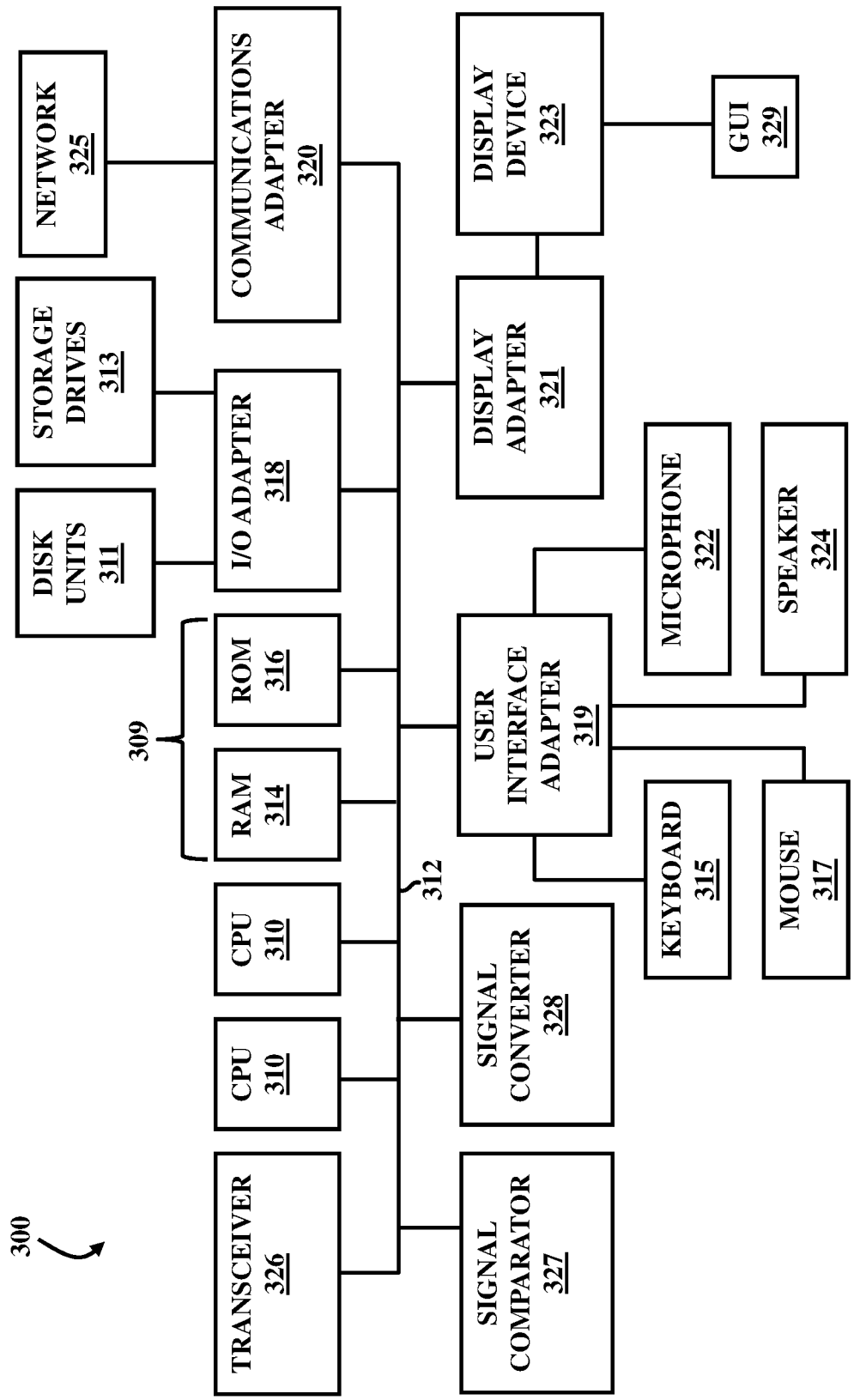
FIG. 8 is a block diagram illustrating a computer system, according to an example herein.

A representative hardware environment for practicing the examples herein is depicted in FIG. 8, with reference to FIGS. 1A through 7. This block diagram illustrates a hardware configuration of an information handling/computer system 300 according to an example herein. The system 300 comprises at least one processor or central processing unit (CPU) 310, which may communicate with processor 22 of printer 10, or in an alternative example, the CPU may be configured as processor 22 of printer 50. The CPUs 310 are interconnected via system bus 312 to at least one memory device 309 such as a RAM 314 and a ROM 316. In one example, the at least one memory device 309 may be configured as the memory device 24 of printer 10. The at least one memory device 309 can include local memory employed during actual execution of the program code, bulk storage, and cache memories which provide temporary storage of at least some program code in order to reduce the number of times code must be retrieved from bulk storage during execution.

The code is configured to receive instructions for a printer 10 to conduct a print job comprising a requested printable media source, a requested printable media size, and a requested printable media type. The code identifies printable media tray settings of a multipurpose tray 14 comprising printable media 16. The code determines a tray 14 from which to conduct the print job based on a combined print criteria comprising the requested printable media source, the requested printable media size, the requested printable media type, and the printable media tray settings. The code determines whether the printable media 16 in the multipurpose tray 14 is a proper size match for the print job. The code calculates an orientation of the printable media 16 based on the combined print criteria and the determination that the printable media 16 is a proper size match for the print job. The code selects a tray setting from which to perform the print job based on the calculated orientation of the printable media 16. The code is further configured to identify that the printable media 16 in the multipurpose tray 14 is the proper size match for the print job when the multipurpose tray 14 is configured in an any size print media configuration.

The code is further configured to conduct tray guide measurements of the multipurpose tray 14 and select a default printable media size based upon a most common printable media size for the tray guide measurements and a location of the printer 10. The code is further configured to measure tray guide positions of the multipurpose tray 14, create an overall list 26 of all sizes of printable media 16 capable of fitting in the multipurpose tray 14 by comparing dimension ranges of the tray guide positions to a predetermined media size dimension list for the multipurpose tray 14 in multiple orientations, create a prioritized list 28 of printable media sizes capable of fitting in the multipurpose tray 14 for the given tray guide positions, and select a particular printable media size based on the prioritized list 28. The code is further configured to use measurements of the tray guide positions to reduce a size of the prioritized list 28. The code is further configured to detect an orientation of the printable media 16 in the multipurpose tray 14, and correct the orientation of the printable media 16 in relation to the print job when the multipurpose tray 14 is configured in the any size print media configuration.

In FIG. 8, an I/O adapter 318 can connect to peripheral devices, such as disk units 311 and storage drives 313, or other program storage devices that are readable by the system 300. The system 300 further includes a user interface adapter 319 that may connect the bus 312 to a keyboard 315, mouse 317, speaker 324, microphone 322, and/or other user interface devices such as a touch screen device, which may be configured as the user interface 12 of printer 10, to gather user input. Additionally, a communication adapter 320 connects the bus 312 to a data processing network 325, and a display adapter 321 connects the bus 312 to a display device 323, which may provide a graphical user interface (GUI) 329 for a user to interact with, which may be configured as the GUI 13 of user interface 12 on printer 10. Further, a transceiver 326, a signal comparator 327, and a signal converter 328 may be connected to the bus 312 for processing, transmission, receipt, comparison, and conversion of electric or electronic signals, respectively.

According to the examples herein, the tray guides 18 allow the processor 22 to select a default media size based upon the most common media size(s) for the tray guide measurement and the locale associated with the printer 10 or print job. Moreover, the tray guide measurements provided by the sensor 20 allow the processor 22 to pare down the media list 26 to a prioritized media list 28 presented on user interface 12 for the tray 14 based upon the dimension(s) measured by the sensor 20. The tray guides 18 also allow for the elimination of rotated media sizes in the list 28 since the processor 22 can automatically detect the proper orientation of the tray guides 18. With reference to the various examples described above, a user can experience the best of both "Any Size" behavior and "Automatic Size Detection" behavior associated with the printer 10. The "Any Size" setting on the printer 10 may allow a user to simply print without error or with reduced error by eliminating media size mismatch. In this regard, the printer 10 prints in the correct orientation corresponding to the print job even when the tray 14 is set to the "Any Size" setting. If the user selects a particular media size, then a subset of sizes is presented in list 28 as opposed to the entire supported size list 26. This allows the user to better identify which media size is most appropriate in a more efficient manner. Because the "Automatic Size Detection" setting is always present on the printer 10, the user is able to print with confidence in that the print image and/or text is correctly oriented and positioned on the media 16 even if the printer 10 is set to "Any Size"/"Any Type" behavior, and as such the media 16 can be inserted into the tray 14 in any direction, and the printer 10 automatically determines the proper orientation based on the requested print job.

The present disclosure has been shown and described with reference to the foregoing exemplary implementations. Although specific examples have been illustrated and described herein it is manifestly intended that the scope of the claimed subject matter be limited only by the following claims and equivalents thereof. It is to be understood, however, that other forms, details, and examples may be made without departing from the spirit and scope of the disclosure that is defined in the following claims.

What is claimed is:

1. A method comprising:
   receiving printable media in a tray of a printer;
   measuring tray guide positions of the tray;
   creating an overall list of all sizes of printable media capable of fitting in the tray by comparing dimension ranges of the tray guide positions to a predetermined media size dimension list for the tray in multiple orientations;
   creating a prioritized list of printable media sizes capable of fitting in the tray for given tray guide positions; and
   selecting a preferred printable media size based on the prioritized list.

2. The method of claim 1, wherein the prioritized list is a subset of the overall list.

3. The method of claim 1, further comprising:
   establishing a default printable media size setting based on a previous setting of the printer; and
   selecting the default printable media size setting for a print job when a default printable media size is in the prioritized list.

4. The method of claim 1, further comprising selecting a highest ranked printable media size setting on the prioritized list for a print job.

5. The method of claim 1, further comprising creating the prioritized list based on the overall list and internal media priority tables associated with the printer.

6. The method of claim 1, further comprising:
   displaying the prioritized list on a user interface operatively connected to the printer; and
   permitting selection of the preferred printable media size through the user interface.

7. The method of claim 1, further comprising using measurements of the tray guide positions to reduce a size of the prioritized list.

8. The method of claim 1, further comprising prioritizing most used media sizes associated with the tray in the prioritized list.

9. A printer comprising:
   a multipurpose printer tray configured to receive printable media;
   a tray guide operatively connected to the multipurpose printer tray;
   a sensor operatively connected to the tray guide and configured to measure minimum and maximum values for both dimensions of the tray guide;
   a processor operatively connected to the sensor;
   a memory comprising instructions executable by the processor to:
      receive instructions for a print job comprising a requested media size;
      select a media size based on the requested media size and media sizes capable of fitting in the multipurpose printer tray to obtain a selected media size for the print job;
      compare dimensions for the selected media size for the print job to the measured minimum and maximum values for both dimensions of the tray guide; and
      select a particular orientation for the selected media size for the print job based on which orientation of the dimensions for the selected media size is a closer fit to the measured minimum and maximum values.

10. The printer of claim 9, wherein the instructions cause the processor to select the orientation for the selected media size based on the only orientation supported by the multipurpose printer tray.

11. The printer of claim 9, wherein the instructions cause the processor to perform any of:
    compare the requested media size to detected dimensions of the tray guide;
    compare a tray guide size setting to the detected dimensions of the tray guide; and
    select a short-edge dimension orientation for the media size.

12. The printer of claim 9, wherein the instructions further cause the processor to create a prioritized list of the media sizes capable of fitting in the multipurpose printer tray for given tray guide positions and obtain the selected media size from the prioritized list.

13. A non-transitory computer readable medium comprising code configured to:
    receive instructions for a printer to conduct a print job comprising a requested printable media source, a requested printable media size, and a requested printable media type;
    identify printable media tray settings of a multipurpose tray comprising printable media;
    determine a tray from which to conduct the print job based on a combined print criteria comprising the requested printable media source, the requested printable media size, the requested printable media type, and the printable media tray settings;

determine whether the printable media in the multipurpose tray is a proper size match for the print job;

calculate an orientation of the printable media based on the combined print criteria and the determination that the printable media is a proper size match for the print job; and select a tray setting from which to perform the print job based on the calculated orientation of the printable media, wherein the code is further configured to identify that the printable media in the multipurpose tray is the proper size match for the print job when the multipurpose tray is configured in an any size print media configuration.

14. The non-transitory computer readable medium of claim 13, wherein the code is further configured to:
    conduct tray guide measurements of the multipurpose tray; and
    select a default printable media size based upon a most common printable media size for the tray guide measurements and a location of the printer.

15. The non-transitory computer readable medium of claim 14, wherein the code is further configured to:
    measure tray guide positions of the multipurpose tray;
    create an overall list of all sizes of printable media capable of fitting in the multipurpose tray by comparing dimension ranges of the tray guide positions to a predetermined media size dimension list for the multipurpose tray in multiple orientations;
    create a prioritized list of printable media sizes capable of fitting in the multipurpose tray for the given tray guide positions; and
    select a particular printable media size based on the prioritized list,
    wherein the code is further configured to use measurements of the tray guide positions to reduce a size of the prioritized list.

16. The non-transitory computer readable medium of claim 13, wherein the code is further configured to:
    detect an orientation of the printable media in the multipurpose tray; and
    correct the orientation of the printable media in relation to the print job when the multipurpose tray is configured in the any size print media configuration.

* * * * *